2,817,664

OMEGA-HALOALKYL QUATERNARY AMMONIUM SALTS AND PREPARATION THEREOF

Chester John Cavallito and Allan Poe Gray, Decatur, Ill., assignors to Irwin, Neisler and Company, Decatur, Ill., a corporation of Illinois No Drawing. Application January 25, 1954
Serial No. 406,052

3 Claims. (Cl. 260—293)

This invention relates to the preparation of omega-haloalkyl quaternary ammonium salts and the compounds per se, and is more particularly concerned with a novel method of preparation of said salts whereby high yields thereof may be obtained.

The preparation of mono-quaternary ammonium salts having the following formula:

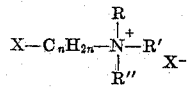

wherein $n$ is an integer from three to twelve, X is a halogen, R and R' are lower-alkyl which may be the same or different or joined together to form a heterocyclic ring, and R'' is lower-alkyl or aralkyl, has caused considerable difficulty in the past. Aside from reactions involving several steps, the direct method previously utilized has involved an appropriate alkylene dihalide being reacted with a selected tertiary amine. However, from an examination of the structure of the alkylene dihalide, it will be noted that there are two equally reactive halogen atoms present which leads to the possibility of both halogens of the same molecule reacting with tertiary amine to form a bis-quaternary. The initial reaction produces a haloalkyl quaternary ammonium salt which competes with the unreacted alkylene dihalide for more tertiary amine. This competition leads to the formation of the bis-ammonium salts as a side products and, in the uncontrolled reaction, results in a serious decrease in yield of the desired mono-quaternary derivative and affords a difficultly purifiable mixture of reaction products. Recently, certain omega-haloalkyl quaternary ammonium salts have indicated a usefulness as intermediates in the preparation of organic compounds having considerable physiological effect, particularly when they are employed as blood pressure depressants. Some of these compounds are disclosed in a copending application Serial No. 410,047, filed February 12, 1954. Therefore, in view of the commercial significance of these intermediates, the poor yields which have been accepted in the past are not at all desirable now.

It is therefore, a principal object of the present invention to provide a process for the preparation of omega-haloalkyl quaternary ammonium salts wherein yields in excess of fifty percent may be readily obtained and, if proper control of conditions is maintained, substantially quantitative yields may be obtained. Still a further object of the present invention is to provide a process for the reaction of a tertiary amine with an alkylene dihalide whereby a mono-ammonium substituent on the alkylene dihalide is obtained in good yields. Another object of the present invention is to provide a process for the reaction of an alkylene dihalide with a tertiary amine in a minimum of an inert solvent, and wherein the tertiary amine is added to a solvent solution of the alkylene dihalide slowly. Other objects will become apparent hereinafter.

It has now been found and is herein first disclosed that, if an alkylene dihalide having the formula:

$$X-C_nH_{2n}-X$$

wherein X is chlorine, bromine or iodine, and $n$ is an integer from three to twelve, inclusive, is reacted with a tertiary amine, having the formula:

wherein R and R' are lower-alkyl which may be the same or different or joined together to form a heterocyclic ring and wherein R'' is lower-alkyl or aralkyl radical, and if the tertiary amine is added to the alkylene dihalide in a minimum of substantially anhydrous inert solvent over a relatively long period of time, that a substantially quantitative yield of mono-ammonium substituent on the alkylene dihalide may be obtained. Representative substantially anhydrous inert solvents which are useful in the process of the present invention include, for example, dry ether, benzene, dioxane, tetrahydrofuran, carbon tetrachloride, toluene, xylene, hydrocarbon solvents, such as pentane, hexane, heptane, or mixtures of such solvents. The reaction is usually conducted at temperatures between about zero and about 150 degrees centigrade, however, room temperature to eighty degrees centigrade is preferred. The term "a minimum of inert solvent" is intended to mean an amount providing a convenient total volume and signifies, usually, a volume of solvent from one to five times the volume of alkylene dihalide. When such an amount of inert solvent is employed, it will be found that the mono-ammonium alkylene dihalide as prepared will separate from the reaction mixture, as a precipitate or oily layer, and therefore, be inert to additional tertiary amine which is added to the reaction mixture. Still another critical element of the present invention is that the tertiary amine and the alkylene dihalide be contacted slowly over a substantial period of time. Thus, it is envisioned that only that amount of tertiary amine will be added to that amount of dihalide as will cause the constant separation of a substantially equal amount of mono-ammonium salt. This may be regulated in the manner known to those in the art. Preferably, the reaction is conducted under anhydrous or nearly anhydrous conditions.

Representative starting materials which are suitable for the process of the present invention include alkylene dihalides, wherein the alkylene group may be either straight or branched chain, as for example, propylene, butylene, isobutylene, pentylene, isopentylene, neopentylene, heptylene, octylene, nonylene, decylene, undecylene, dodecylene, isododecylene, neododecylene, tertiary dodecylene, et cetera. Of course, halogens which are suitable as substituents on the alkylene dihalide include, only chlorine, bromine, or iodine. It is envisioned as a critical element of the present invention that materials which are suitable will be those materials containing alpha, omega-dihalide substituents on the alkylene portion. Representative tertiary amines which are suitable for forming quaternary ammonium salts of the alkylene dihalide hereinbefore specified are, for example, trimethylamine, methyldiethylamine, dimethylbenzylamine, diethylphenylpropylamine, triethylamine, propyldimethylamine, butyldimethylamine, 1-methylpyrrolidine, 1-hexyl-pyrrolidine, 1-pentylpiperidine, 1-nonylpiperidine, 1-methylmorpholine, et cetera, that is, a tertiary amine group containing from three to fourteen carbon atoms.

Following the procedure of the present invention, it is possible to prepare compounds such as, for example, 3-bromopropyl-diethylmethylammonium bromide, 7-chloroheptyl-N-propyl-pyrrolidinium chloride, 12-iodododecyl- N-benzylpiperidinium iodide, 10-iodododecyl-trimethylammonium iodide, et cetera.

The following examples are given to illustrate the procedures of the present invention; however, they are not to be construed as limiting.

Example 1

To 50.5 grams (0.25 mole) of 1,3-dibromopropane, warmed on a steam bath, was added dropwise with stirring a solution of 14.3 grams (0.164 mole) of methyldiethylamine in fifty milliliters of dry benzene, the addition of all the material requiring one and one-half hours. This rate of addition was such as to allow salt precipitation to occur approximately as tertiary amine was added. The reaction mixture was allowed to stand overnight at room temperature and the supernatant liquor separated from the oily product. The oily product was washed with fresh benzene, taken to dryness in vacuo twice with the addition of more benzene in order to azeotrope out any water, and finally dried over phosphorus pentoxide in a vacuum desiccator. There was thus obtained 27.9 grams (59 percent of the theoretical yield) of 3-bromopropyldiethylmethylammonium bromide as a white, hygroscopic solid, melting from 120 to 130 degrees centigrade.

*Analysis.*—Calculated: Bromine (ionic) 27.64. Found: 27.71.

Example 2

Into a solution of 24.4 grams (0.1 mole) of 1,6-dibromohexane in 100 milliliters of benzene at room temperature was slowly bubbled 5.9 grams (0.1 mole) of anhydrous trimethylamine. The precipitate which formed rapidly during the course of this process was collected, washed with benzene and dried. A yield of 25.0 grams (82 percent of the theoretical yield) of crude (calculated as ninety percent pure on the basis of analysis) 6-bromohexyltrimethylammonium bromide, melting at 98–100 degrees centigrade was obtained.

*Analysis.*—Calculated: Bromine (ionic) 26.36. Found: 27.79.

Example 3

As an alternative to the method described in Example 1, 3-bromopropyldiethylmethylammonium bromide may be prepared in the following manner. Into a solution of 26.3 grams (0.2 mole) of diethylaminopropanol in sixty milliliters of benzene cooled in an ice bath was bubbled 22.8 grams (0.24 mole) of methylbromide. A white precipitate was formed rapidly. After standing overnight at room temperature in a stoppered flask, the reaction mixture was filtered to give a quantitative yield of 3-hydroxypropyldiethylmethylammonium bromide, melting at 155 degrees centigrade.

A solution of this product in 38.6 milliliters of 48 percent hydrobromic acid (0.34 mole) and eight milliliters of ethanol was heated for fifteen hours on the steam bath. After concentration of the solution to dryness in vacuo, the liquid residue was washed with dry ether, and evaporated to dryness in vacuo several more times with the addition of benzene. A yield of 42.6 grams of crude 3-bromopropyldiethylmethylammonium bromide, melting at 115–125 degrees centigrade, was obtained.

In the manner of the foregoing examples, among other omega-haloalkyl quaternary ammonium salts prepared were:

| No. | Method | Name | M. P.,° C. | Analysis, Br (ionic) | | Calc'd Purity, Percent |
|---|---|---|---|---|---|---|
| | | | | Calc'd | Found | |
| 4 | Ex. 2 | 5-Bromopentyltrimethylammonium bromide. | 133–136 | 27.64 | 28.10 | Pure. |
| 5 | Ex. 2 | 10-Bromodecyltrimethylammonium bromide. | 100–103 | 22.25 | 24.52 | 85. |
| 6 | Ex. 3 | 3-Bromopropyl-N-methylpiperidinium bromide. | Indefinite | 26.54 | 26.60 | Pure. |
| 7 | Ex. 1 | 3-Bromopropyl-N-methylpyrrolidinium bromide. | 172–174 | 27.84 | 28.15 | Pure. |
| 8 | Ex. 1 | 3-Bromopropylbenzyldimethylammonium bromide. | 156–158 | 23.70 | 24.09 | Pure. |

Various modifications may be made in the present invention without departing from the spirit or scope thereof, and it is to be understood that we limit ourselves only as defined in the appended claims.

We claim:

1. A process for the preparation of omega-haloalkyl quaternary ammonium salts which comprises: adding under substantially anhydrous conditions to an alkylene dihalide having the formula:

$$X-C_nH_{2n}-X$$

wherein X is a halogen selected from the group consisting of chlorine, bromine and iodine, and $n$ is an integer from three to twelve, inclusive, a tertiary amine having the formula:

wherein R and R' are lower-alkyl, which may be the same, different, or joined together to form a heterocyclic ring, and wherein R'' is selected from the group consisting of lower-alkyl and aralkyl, at a temperature between about zero and 150 degrees centigrade, said addition being conducted in the presence of an inert solvent and at a rate up to that which is substantially equal to the rate of formation of the omega-haloalkyl quaternary ammonium salt.

2. The process of claim 1 wherein the solvent is benzene.

3. The process of claim 1 wherein the temperature employed is between room temperature and eighty degrees centigrade.

References Cited in the file of this patent

UNITED STATES PATENTS 2,504,977    Gump                Apr. 25, 1950

OTHER REFERENCES

Fourneau et al.: Annales pharmaceutiques françaises, vol. 4, pp. 166–72, abstracted in Chemical Abstracts, vol. 41–4237 (f) 1946.

Marechal et al.: Annales pharmaceutiques françaises, vol. 4, pp. 172–181, abstracted in Chemical Abstracts, vol. 41–5099 (i), 1946.

Bovet et al.: Comptes rendus des seances de la societe de biologie et de ses filiales, vol. 140, pp. 91–3, abstracted in Chemical Abstracts, vol. 41, column 3528 (g) 1946.

Obata: Journal of the Agricultural Chemical Society of Japan, vol. 18, pp. 1010–1012, abstracted in Chemical Abstracts, vol. 45, column 7002 (b) 1950.